INVENTORS
Sigurd Johannes Hoyrup
Richard V. Pagendarm
BY Howard G. Russell
their ATTORNEY INVENTOR.
Sigurd Johannes Hoyrup
Richard V. Pagendarm
BY
Howard G. Russell
their ATTORNEY July 6, 1965

S. J. HOYRUP ETAL 3,192,837

METHOD OF AND DEVICE FOR FORMING HEAT
SEALABLE BLANKS INTO BOX SHAPE

Filed June 7, 1962

INVENTOR.
Sigurd Johannes Hoyrup
BY Richard V. Pagendarm

Howard G. Russell
their ATTORNEY

INVENTOR.
Sigurd Johannes Hoyrup
Richard V. Pagendarm
BY
Howard G. Russell
their ATTORNEY 3,192,837
METHOD OF AND DEVICE FOR FORMING HEAT SEALABLE BLANKS INTO BOX SHAPE
Sigurd Johannes Hoyrup, Monta Vista, and Richard V. Pagendarm, Hillsborough, Calif., assignors, by mesne assignments, to Bradford Speed Packaging and Development Corp., New York, N.Y., a corporation of Delaware
Filed June 7, 1962, Ser. No. 200,727
12 Claims. (Cl. 93—51)

This invention relates to improvements in the manufacture of folding boxes assembled from flat box blanks by folding and subsequent bonding of certain box portions by means of a thermoplastic adhesive preapplied to the flat blank. The adhesive composition may be preapplied as a coating or its preapplication may be limited to certain defined areas along which an adhesive bond is subsequently formed.

The principal object of this invention is to increase the production rate and to simplify the machine or device for folding and adhesively bonding the blank.

It is conventional practice first to fold blank having a thermoplastic adhesive composition preapplied thereto into box form, and then to subject the areas to be bonded to compressive force accompanied by heating in order to soften the composition sufficiently to become tacky and bond.

The production rate obtainable by such practices is low due to the fact that paperboard is a relatively poor heat conductor requiring application of heat for a considerable period of time to permit the heat to penetrate the board and soften the adhesive.

If a plunger and die type mechanism is employed for folding the blank, either the plunger, or the die, or both plunger and die are heated, and the folded blank must be retained in the die for a time sufficient to permit the heat to penetrate the board. A complication arises from the fact that the adhesive bond is weak until cooled. Difficulties are therefore experienced in removing a formed and bonded blank from a heated plunger without disturbing the bond itself.

In plunger and die type machines a certain period of dwell is thus required during which the plunger remains stationary in the die. Such a drive is of necessity more complicated and less rapid than a driving mechanism for imparting uninterrupted oscillating motion to the plunger.

A prior patent to Hoyrup et al. No. 3,085,479, dated April 16, 1963, discloses an improved form of device for forming and bonding heat sealable blanks. It comprises a preheating device for applying heat to the blank to soften the adhesive prior to the moment the blank is driven into a die by the plunger. As a result of the preheating, the dwell time of the plunger is considerably reduced and the productivity correspondingly increased.

The present invention involves, among other features, the application of heat to both the areas of the blank which are to be joined when the plunger drives the blank through the folding die. No machine time is lost during the period of preheating. One blank area is preheated during the period of transport of the blank from the magazine to the die. The second area is heated during the period between the deposit of the blank by the feeder and the moment the plunger engages the blank.

Each area is heated by application of heat directly to the coating rather than by driving heat through the board. It is most advantageous to apply heat to one area from one side of the blank and to apply heat to the other area, which is to be bonded thereto, from the other side of the blank. In neither case need heat travel through the board and the time of heat application may be very brief.

No dwell time is required in the die at all, but the blank may be handled at the same rate as a glued blank.

In many instances heating of the die and of the plunger can be dispensed with. It has been found, for example, that the bonding of polyethylene coated blank areas can be accomplished successfully by an unheated plunger and an unheated die. Thus, in effect, the invention provides a heat sealing machine in which both plunger and die are unheated.

Furthermore, the invention makes it unnecessary to employ a period of dwell for the purpose of compression. In its place the folded blank is preferably moved by the plunger through a nip of rollers which exert temporary compressive force for only a brief fraction of a second. Immediately thereafter the formed and bonded blank, or rather the formed box, is removed from the plunger by suitable removal devices such as suction devices, compressed air, or box retaining elements which snap over the top edge of the box and arrest the box while the plunger is retracted. The box then drops onto a suitable conveyor below.

The operating rate thus obtainable equals that of high speed glue box formers.

The various objects, features and advantages of this invention will appear more fully from the detailed description which follows accompanied by drawings illustrating a preferred embodiment of the invention. The invention also resides in certain new and original features of construction and combination of elements, as well as steps and sequences of steps hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
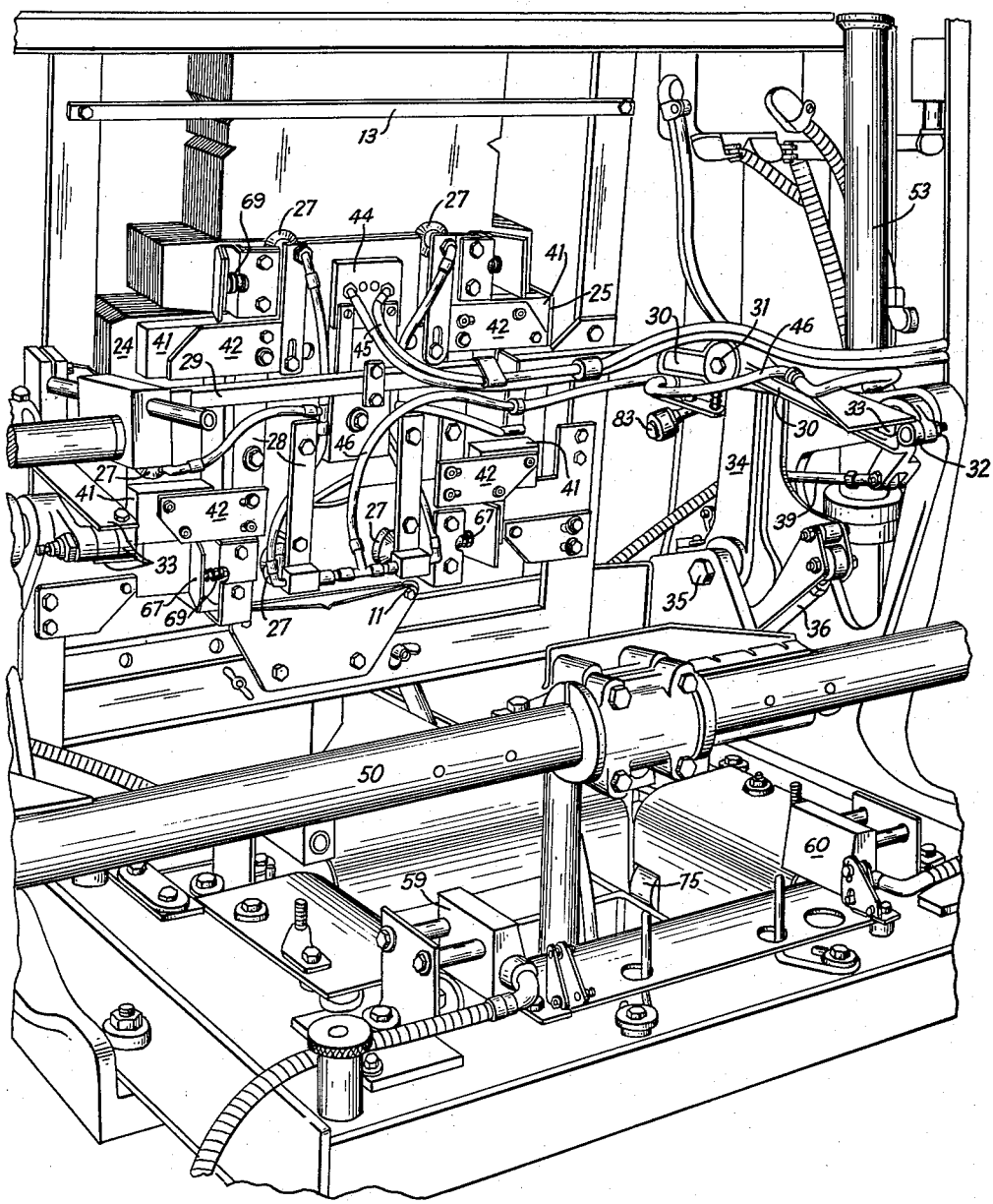
FIG. 1 is a perspective view of a plunger and die mechanism for feeding, preheating and forming a box blank.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it is understood that structural details may be modified in various respects without departure from the principles of the invention and that the invention may be incorporated in other structural forms than shown.

The blank forming and bonding mechanism shown in the drawings comprises a magazine in which a stack of blanks B rest on edge on supporting bars 11 (best seen in FIG. 4) and are retained against falling out by lateral retaining lips 12 and a cross bar 13.

A stack pusher at the rear of the stack urges the blanks towards the magazine gate defined by the lips 12 and the bar 13. The pusher, which is moved by either spring force or gravity, is not visible in the figures. It is of conventional construction, as are the other details of the magazine.

Figure 3:
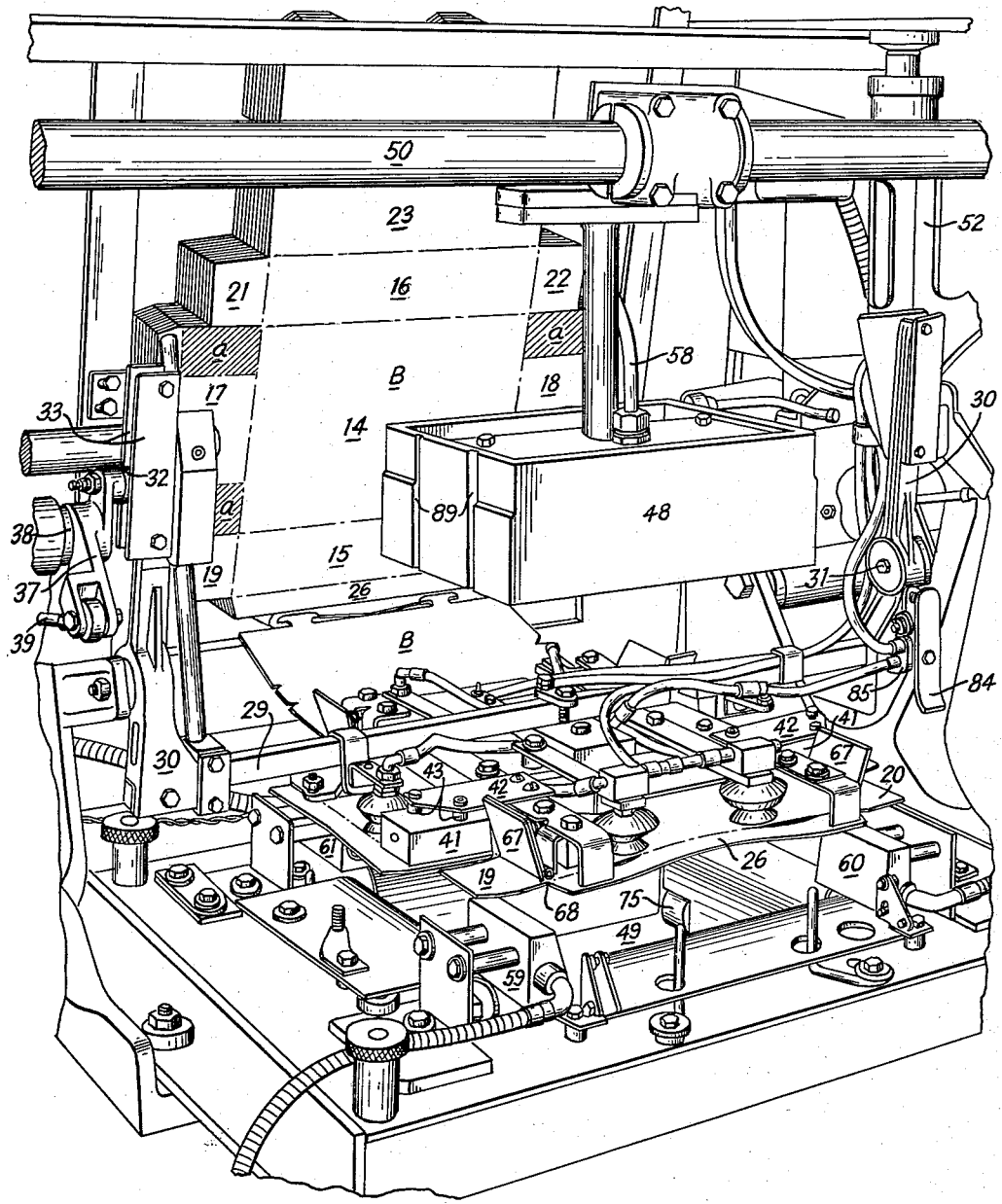
Figure 4:
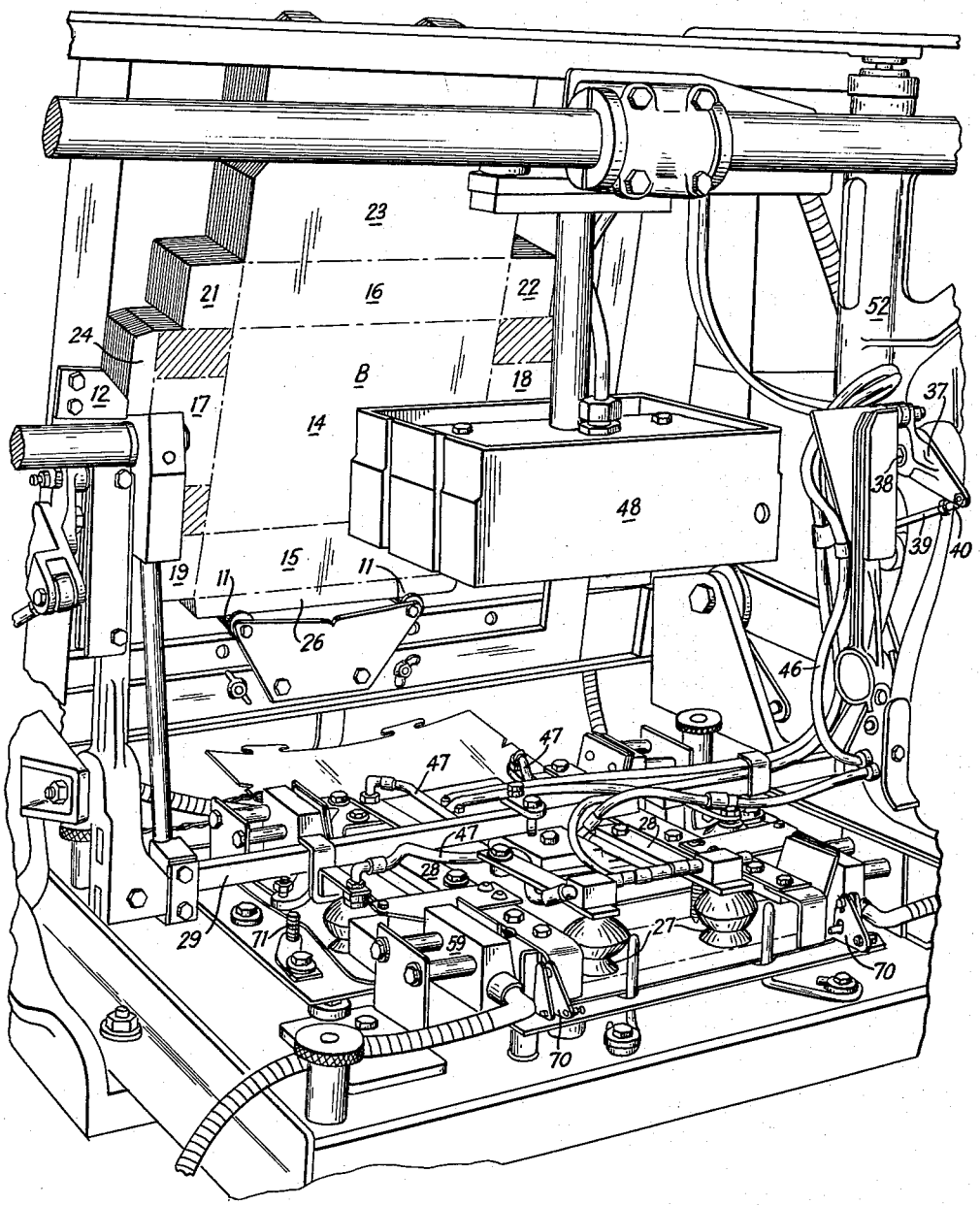

The shape of the blank is best seen in FIGS. 3 and 4. The blank comprises a bottom panel 14, front and rear panels 15, 16, end panels 17, 18 and corner flaps 19, 20, 21, 22 which are to be adhered to the end panels when the blank is shaped into box form. A cover panel 23 is articulated to the rear panel. The cover is shaped to lock with dust flaps 24, 25 on the end panels and with a front flange 26 on the front panel 15.

Figure 5:
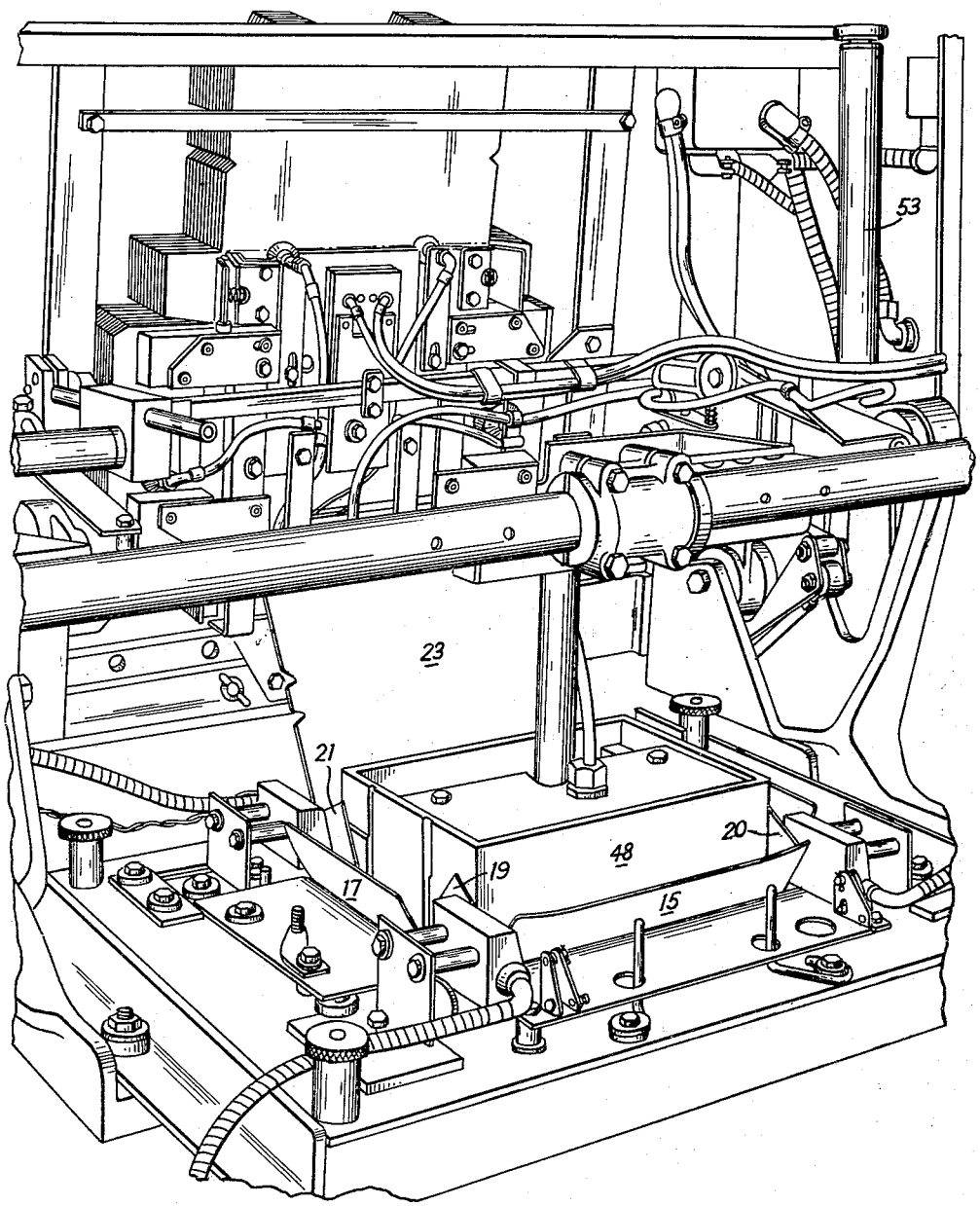
Figure 6:
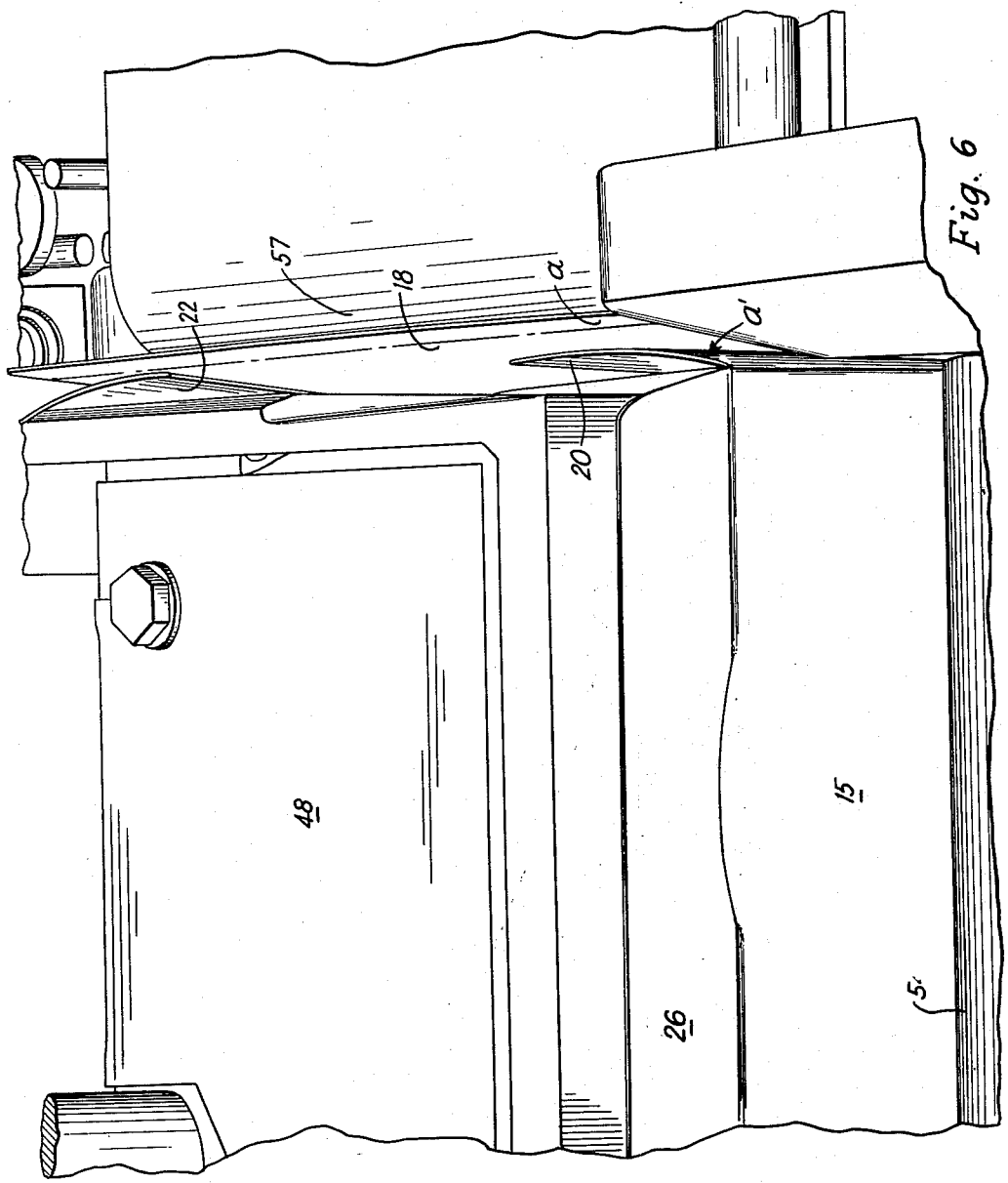
FIG. 6 is a perspective view illustrating in sequence of folding certain flaps and panels of the blank.

While the blank may be made of paperboard having an overall coating of a thermoplastic on its front and its rear surface, the illustrated blank has eight limited areas of polyvinyl coating applied thereto, four areas "a" being at the ends of the end panels on the surface facing the observer, the other four areas "a'" being on the back surface of the corner flaps, hence not visible in FIGS. 1 to 5, but shown in part in FIG. 6.

Blanks B are removed from the magazine, one by one, by a blank feeder of basically known construction comprising, in the illustrated eample, six vacuum cups 27 mounted on a framework 28 attached to a transverse feeder bar 29.

Each end of the feeder bar 29 is secured to one end of a double armed lever 30. As the mechanisms at both ends are identical, it will be sufficient to describe the one at the right hand portion of the figures.

The double armed lever 30 is pivotally mounted intermediate its ends at 31, and its other arm engages a roller 32 pivotally as well as slidably by means of a track 33. The pivot 31 is at the end of an oscillating arm 34 pivoted at 35 and actuated by a push rod 36.

The roller 32 is mounted on one arm of a bell crank lever 37 which is pivotally mounted at 38. The bell crank lever 37 is oscillated by a push rod 39 attached to its other arm at 40 (see also FIG. 4).

The construction and geometry of the illustrated feeder mechanism are known and are described in greater detail in the patent to F. M. Lefief No. 2,805,060, dated September 3, 1957.

For the purpose of the present description it is sufficient to state that the feeder mechanism performs three distinct motions. It first moves the vacuum cups towards the foremost blank B in the stack to attach the cups thereto and then withdraws the blank through the magazine gate by a motion substantially normal to the plane of the blank (FIG. 1).

The feeder next moves the blank on a substantially arcuate path, essentially in the direction of the plane of the blank (FIG. 2) until the blank arrives above a die about to be described (FIG. 3). The feeder then deposits the blank by a motion substantially normal to the plane of the blank (FIG. 4) and thereafter returns to pick up the next blank (FIG. 5).

As far as described, the feeder mechanism is conventional.

In order to soften the preapplied adhesive before the blank arrives at the folding mechanism later to be described, the feed carrier frame 28 is fitted with four electric heaters 41, one for each of the areas a, and so positioned as to register with the bordering areas. The heating elements 41 are carried by arms 42 extending from the frame 28 and studs 43 (see FIG. 3) are placed between the elements 41 and the arms 42 to minimize heat transfer to the frame itself.

The flow of electric energy to the elements 41 is controlled by a thermostatic switch mechanism 44 from which flexible power cables 45 extend to the stationary frame of the machine. The cables 45 run alongside a vacuum tube 46 supplying vacuum to branch tubes 47 leading to the individual vacuum cups 27.

The vacuum cups are of the telescoping type and retract after attaching themselves to a blank. In retracted position they draw the blank against the heater element 41. The retracted position is best seen in FIG. 3. FIG. 4, by contrast, shows the cups in extended position brought about by shutting off the vacuum in line 46 and venting of the line 46 to the atmosphere, as is known practice.

The amount of heat supplied to a blank about to be set up into box form is metered with great accuracy by the heating mechanism. The period of application of heat is equal to the travel time of the blank from the magazine gate to the deposit station above the die later to be described. The heat is supplied to a single blank only and the degree of heating is not influenced by the number and position of the blanks nor by warping of the blanks in the magazine, as would be the case if a heater were mounted on the magazine gate rather than on the feeder carrier. Blanks are rarely perfectly plane, hence the distance of the areas of the foremost blank from a magazine-mounted heater is not uniform in actual production and the amount of transferred heat varies accordingly.

Any existing warp in the blank is eliminated in the illustrated mechanism by pulling the blank up against the heaters by the telescoping action of the vacuum cups. This is particularly well visible in FIG. 3.

The mechanism which folds the blank into box shape is basically a plunger 48 and an open ended die 49 through which the plunger forces the blank.

Plunger and die devices are widely used for forming and gluelessly interlocking box corners. The present plunger and die, although superficially resembling the known forming devices, differs therefrom in significant details, as will be pointed out below.

At this point it is sufficient to state that the plunger 48 is attached to a horizontal drive bar 50 at 51. The drive bar reciprocates vertically in timed relationship to the feeder motion. The ends of the drive bar are mounted on brackets 52 slidable on vertical guide columns 53. Drive mechanisms for this purpose are known. A preferred form is described in the above mentioned Lefief Patent 2,805,060.

Figure 2:
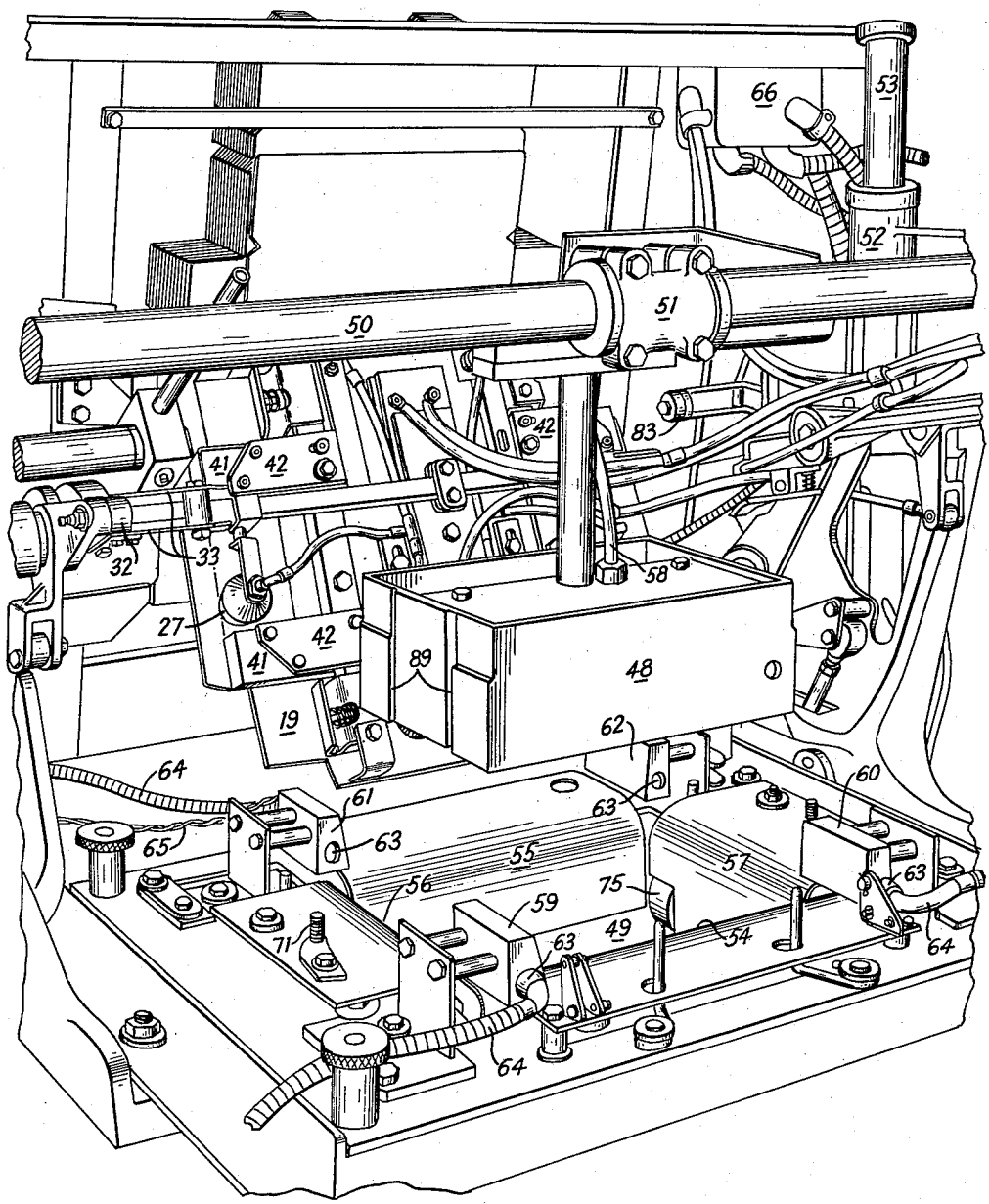
FIGS. 2 to 5 are perspective views of successive phases of operation of the machine.

The die is best seen in FIG. 2 and comprises front and rear camming surfaces 54, 55 and end camming surfaces 56, 57. The curvature and the vertical setting of the front and rear camming surfaces 54 and 55 in relationship to the end camming surfaces 56 and 57 is such that the front and back panels 15 and 16 of the blank are first folded into upright position against the sides of the plunger 48 before the end panels 17 and 18 are folded against the ends of the plunger. This will be set forth in greater detail further below in connection with FIG. 6.

The clearance between the vertical portions of the camming surfaces and the vertical plunger surfaces, in other words, the clearance of the plunger with respect to the throat of the die surfaces, is about twice the thickness of the blanks to be folded.

The plunger may be heated and is for this purpose fitted with an internal heating element to which a cable 58 leads. In practice it was found that heating of the plunger is unnecessary when bonding board other than paraffine wax coated board. In handling the latter, moderate heating of the plunger prevents an accumulation of wax on the plunger. The heating is of little or no significance with respect to the bonding of the thermoplastic coatings on surfaces a and a'.

The die is fitted with four prefolding elements 59, 60, 61 and 62, one near each corner of the mouth of the die and in a position to engage the four corner flaps 19, 20, 21 and 22 of the blank carried by the feeder. This relationship is best seen in FIG. 3.

The prefolding elements are equipped with electric heating elements inserted into a bore in each prefolding element. This is best seen in FIG. 2 at the prefolder 59. The heating element 63 is supplied with electricity through a cable 64. All four heating elements are preferably in series to heat evenly. Only one prefolder need be fitted with a temperature sensor for controlling the temperature of all four prefolders. In the illustrated machine this is the prefolder 61. Two leads 65 extend from the sensor (not visible) to a suitable control device of conventional construction housed in a control box 66 near the upper right hand corner of the figure.

When the feeder deposits the blank above the die and at a level below the tops of the prefolders 59, 60, 61 and 62 (FIGS. 3 and 4), the corner flaps 19, 20, 21 and 22 are folded upwardly and come to rest against the upwardly slanted heating surfaces of the prefolders.

In order to insure good contact between the flaps and the heating surfaces the feeder carrier is provided with spring urged pivoted plates, one for each prefolder.

One such plate is seen at 67 in FIG. 3. It coacts with the heated prefolder 59 and is pivotally mounted at 68. A spring 69 urges the plate outwardly against the heating surface of the prefolder 59 and is best seen in FIG. 1.

Heat is transferred to the adhesive coating on the underside of the corner flaps as soon as the feeder deposits the blank on the die (FIG. 4). The feeder carrier then releases the blank by interruption of the vacuum and venting of the vacuum cups 27 (FIG. 4). The feeder thereafter returns to pick up the next blank. Simultaneously the plunger descends to force the blank through the die (FIG. 5).

In the interval the blank is retained in engagement with the prefolders by catches 70 of conventional construction which snap above the edges of the deposited blank. The edges of the dust flaps are frictionally engaged by threaded retaining bolts 71 (FIG. 4).

The period and degree of heating of the corner flaps is accurately determined and is equal for all blanks of a production run. The period is equal to the time the blank rests in engagement with the heated prefolders from the moment of deposit by the feeder until the moment of removal by the plunger 48 (FIG. 5). If the machine is operated at an increased rate of speed the heater voltage may be increased correspondingly.

The plunger next drives the preheated and prefolded blank into the die (FIG. 5). The sequence of folding operations is such that the front and back panels 15 and 16 are folded into vertical position against the vertical front and back surfaces of the plunger before the end panels 17, 18 contact the corner flaps 20, 22 (FIG. 6).

While in the forming of gluelessly interlockable blanks a sliding of the corner flaps with respect to the overlying or underlying box walls is essential in order to insert the corner flap into a locking cut in the wall, such sliding is inadmissible in the present case, as the bond about to be formed is almost instantaneous and substantially has the characteristics of a contact bond.

It is seen from FIG. 6 that the front camming element 54 erects panel 15 fully before the end camming element 57 moves end panel 18 into contact with flaps 20, 22.

The bond is formed at an instant immediately following that shown in FIG. 6, as the plunger 48 continues its downward motion. The motion is extremely rapid, as follows from the fact that between 40 and 100 boxes are formed per minute, the figure 40 being for large boxes, the figure 100 being for boxes of the size of retail frozen food boxes.

Figure 7:
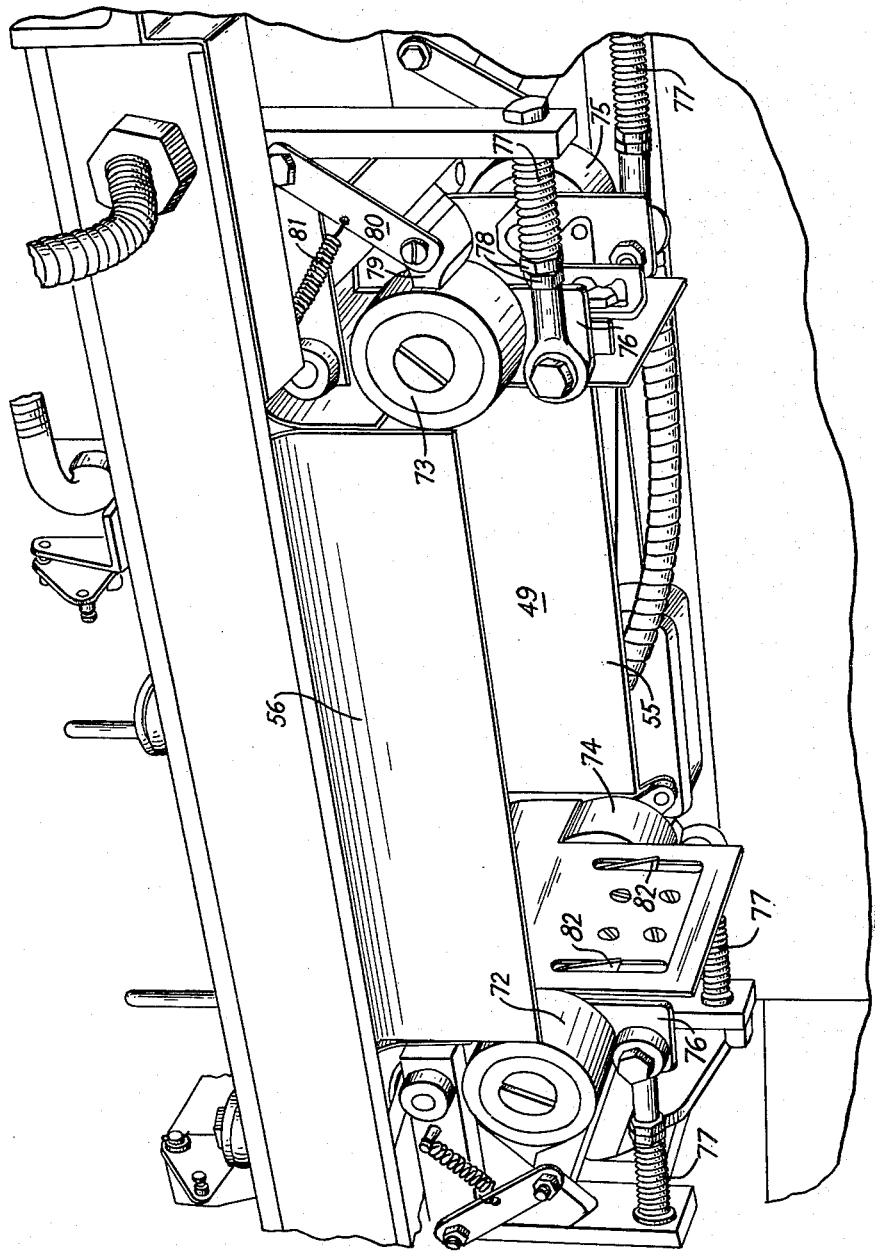
FIGS. 7 and 8 are perspective views of a mechanism for exerting compressive force on the folded blank showing two successive phases of operation.

FIG. 7 illustrates the lower portion of the die at a moment prior to entry of the plunger and folded blank into it. Four compression rollers 72, 73, 74, 75 are mounted on tiltable supports 76, each support being urged towards the interior of the die by a compression spring 77. The spring compression is adjustable by means of nuts 78.

Each roller is provided with a scraper 79 to remove any accumulation of adhesive therefrom. The scraper is mounted on an arm 80 drawn towards the roller by a spring 81.

Opposite rollers 72, 73 and 74, 75 form a nip through which the folded blank, internally supported by the block-like plunger, passes. The roller nip exerts momentary compression on the bonded surfaces a, a'.

FIG. 7 also shows spring urged catches 82 which engage the top edges of a box moved by the plunger into a position low enough to permit the catches to snap above the top edge. These catches retain the box in the die when the plunger retracts and thus, in effect, strip the box from the plunger. Such catches 82 are conventional elements in machines for gluelessly interlocking box corners. The plunger ends are provided with clearance grooves 89 (FIG. 2) to clear the catches which are normally in extended position (FIG. 7) and are only moved out of the way when a box passes through the die (FIG. 8).

Figure 8:
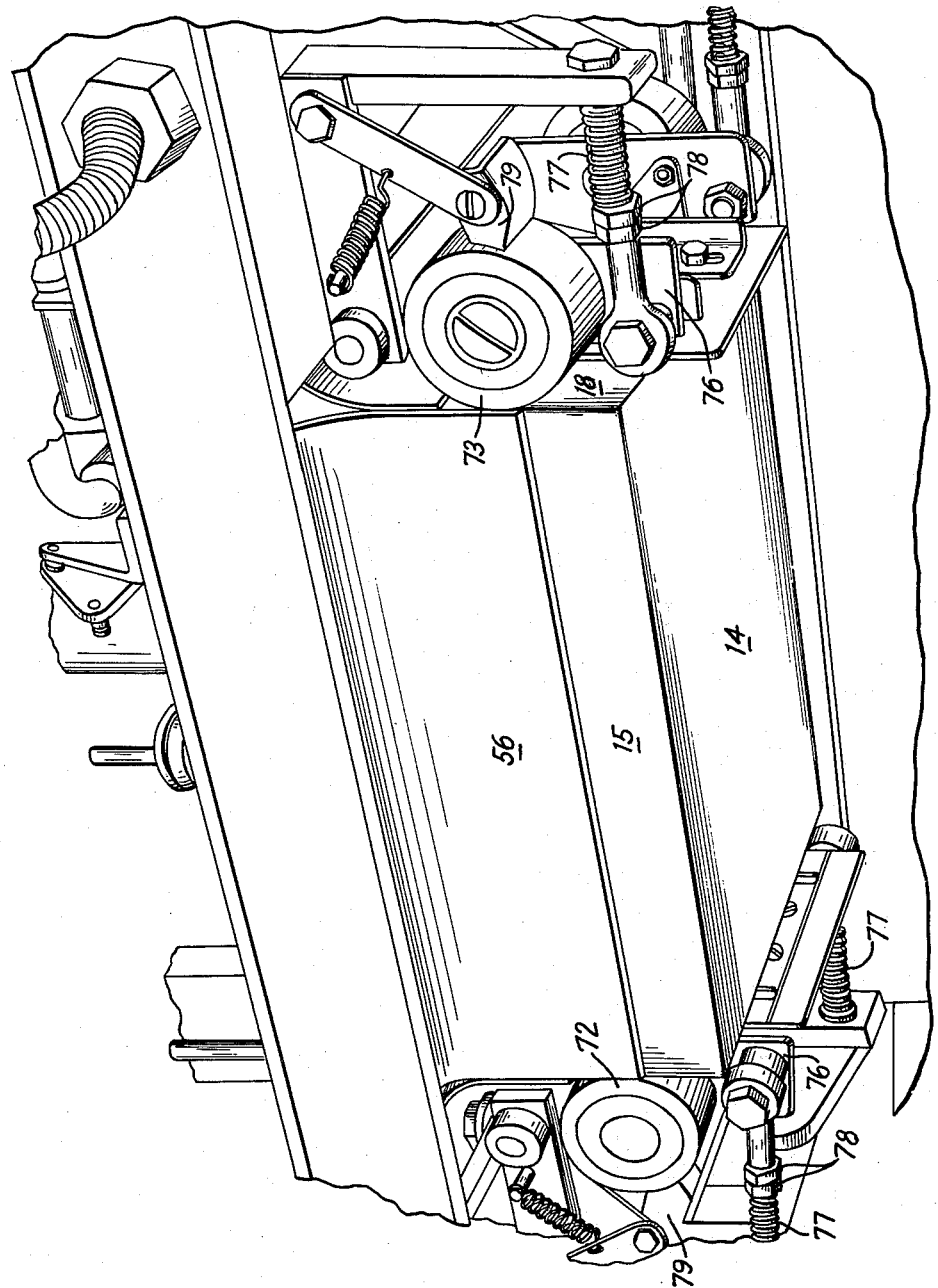

FIG. 8 shows the formed and corner-bonded box at the end of its passage through the roller nip. The plunger continues its downward motion until the top edge of the dust flaps on the box ends move below the catches 82 (FIG. 7). The plunger then retracts and the box drops onto a suitable discharge device, such as a chute, conveyor, or the like (not shown).

When the machine is to be shut off provision is made to arrest the machine in a position in which there is no blank on the feeder carrier and no blank is in engagement with the prefolder.

This is accomplished as follows: The machine is fitted with a no demand-no feed device, as disclosed in the patent to Baker and Posen No. 3,089,698, dated May 14, 1963. The device comprises basically a semaphore type arm carrying a roller 83 (FIG. 2). In the position of normal operation the roller is in a position in which it clears the arm and roller. In a position of "no demand" or "shut off," the roller is in the path of the actuating lever 84 of a vacuum vent valve 85 on the feeder bar. The lever is deflected, vents the vacuum cups to the atmosphere and no blank is removed when the feeder contacts the foremost blank in the magazine.

Figure 9:
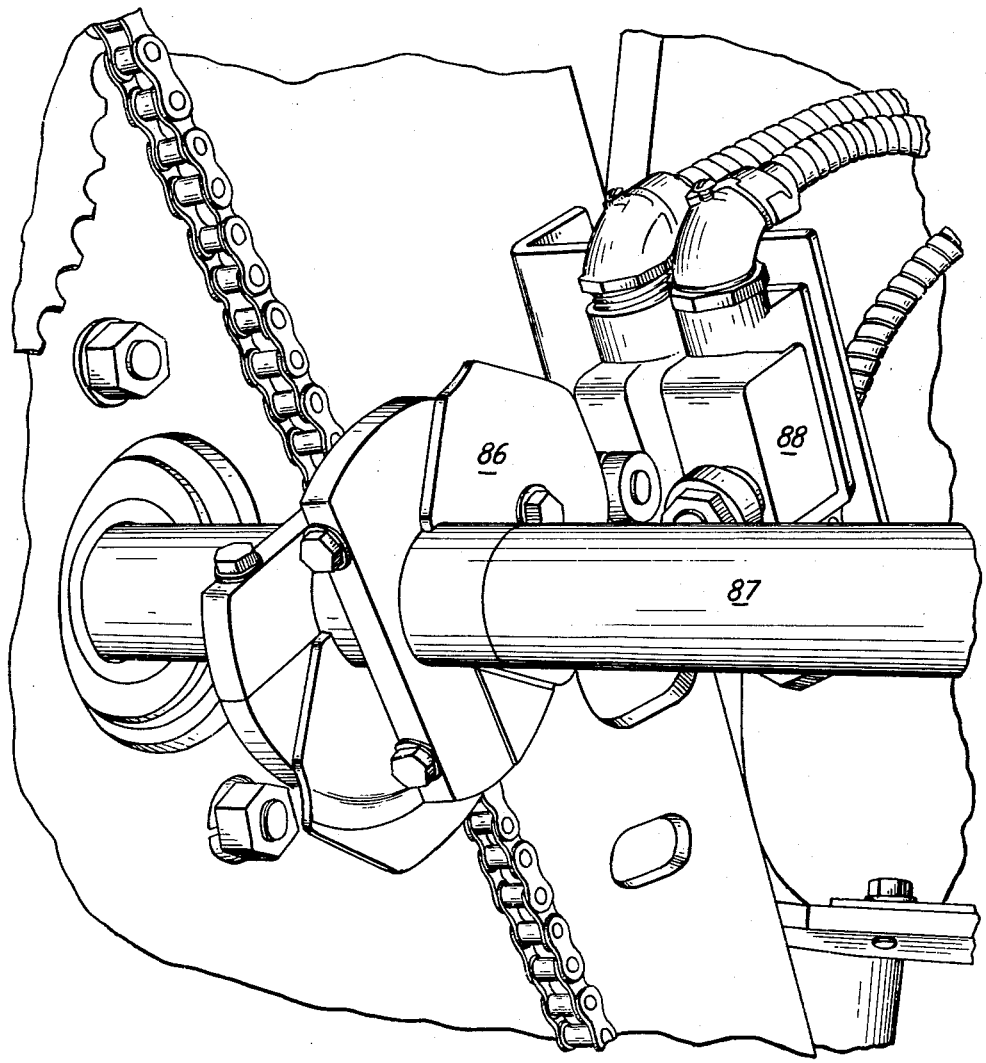
FIG. 9 is a perspective view of a cam and switch assembly for bringing the mechanism to rest at a predetermined point of operation.

The semaphore arm and roller are moved into the "no demand" position when it is desired to bring the machine to a halt. The machine then continues its motion and the feeder runs idle for one stroke. The plunger clears the last blank out of the die. Immediately after the discharge of the last formed blank from the die, the machine is brought to a halt in a position in which the feed carrier is halfway between the die and the magazine. At this moment a cam 86 on the main shaft 87 of the machine (making one revolution per machine cycle) actuates a switch 88 (FIG. 9) which breaks the drive circuit and brings the machine to a stop.

Obviously the present method may be practiced by other specific forms of machines and the illustrated form of machine may be modified to handle other forms of blanks.

Appropriate changes and modifications for such purposes will be evident to persons skilled in the art and familiar with this disclosure.

What is claimed is:

1. The method of handling a blank of paperboard comprising a bottom, front and back walls articulated to said bottom, corner flaps articulated to said walls, and end panels articulated to said bottom, said blank comprising areas on both surfaces at which a heat sealable plastic coating is preapplied, in a machine for forming the blank into box shape and adhering blank portions at the said areas, the machine comprising a blank magazine, a forming die, a feeder for carrying individual blanks from the magazine to the die and a plunger for forcing the blank through the die, the method comprising:

applying from one side of the blank heat to the bonding areas of the end panels while the blank is being transported by said feeder from the magazine to the die;

depositing said blank above the mouth of the die and applying from the other side of the blank heat to the bonding areas of the corner flaps while the blank is substantially at rest above said mouth;

then engaging the blank by the plunger and folding first the said walls and flaps against the plunger and then folding the end panels into contact with said flaps;

then passing the flaps and panels while the box is still on the plunger through the nip of a pair of rollers; and then withdrawing the plunger from the box at a point beyond the nip.

2. The method of handling a blank of paperboard comprising a bottom, front and back walls articulated to said bottom, corner flaps articulated to said walls, and end panels articulated to said bottom, said blank comprising areas on both surfaces at which a heat sealable plastic coating is preapplied, in a machine for forming the blank into box shape and adhering blank portions at said areas, the machine comprising a blank magazine, a forming die, a feeder for carrying individual blanks from the magazine to the die and a plunger for forcing the blank through the die, the method comprising:

applying from one side of the blank heat to the bonding areas of the end panels while the blank is being transported by said feeder from the magazine to the die;

depositing said blank above the mouth of the die and simultaneously folding said flaps into an angular position with respect to the remainder of the blank;

applying heat from the other side of the blank to the bonding areas of said flaps while the blank is substantially at rest above said mouth;

then engaging the blank bottom by the plunger and folding first the said walls into right angular position with respect to the bottom and the said flaps into right angular position with respect to said walls and against the plunger and then folding said end panels into contact with said flaps, while simultaneously advancing the blank into said die;

then passing the flaps and panels, while the formed box is still on the plunger, through the nip of a pair of rollers;

and finally removing the box from the plunger at a point beyond the nip.

3. The method of folding a paperboard blank into box shape and adhering the blank at bonding areas, the blank comprising a bottom, front and back walls articulated to said bottom, corner flaps articulated to said walls, and end panels articulated to said bottom, said blank having preapplied thereto a heat softenable plastic coating on both surfaces at said areas, the method comprising:

applying from one side of the blank heat to the bonding areas of the end panels;

applying from the other side of the blank heat to the bonding areas of the corner flaps;

folding the walls into right angular position to the bottom and folding the said flaps into right angular position to both said bottom and said walls and simultaneously supporting the thus folded blank by a block;

then folding the end panels into adhesive contact with said flaps;

then passing the folded blank while still internally supported by said block through a nip of rollers so disposed as to exert momentary compressive force to the bonding areas;

and finally removing the box from the block.

4. The method of folding a paperboard blank into box shape and adhering the blank at bonding areas, the blank comprising a bottom, front and back walls articulated to said bottom, corner flaps articulated to said walls, and end panels articulated to said bottom, said blank having preapplied thereto a heat softenable plastic coating on both surfaces at said areas, the method comprising:

applying from one side of the blank heat to the bonding areas of the end panels;

folding the said flaps into an angular position with respect to the respective walls to which they are articulated;

applying from the other side of the blank heat to the bonding areas of the folded flaps;

placing a plunger against said bottom and folding the said walls into right angular position against sides of the plunger and folding said flaps into right angular position to both said bottom and said folded walls against the ends of the plunger;

then folding the end panels into adhesive contact with said flaps;

passing said plunger with the folded blank about the plunger through a nip of rollers so disposed as to exert momentary compressive force to said bonding areas;

and finally removing the folded blank from the plunger.

5. In the method of setting up a carton from a blank comprising two bonding areas which in the blank lie on opposite blank surfaces and which in the set-up condition overlie and are adhered to each other by a thermoplastic adhesive pre-applied to said areas, the steps of:

applying from one side of the blank heat to one bonding area when engaging the blank for removal from a magazine and maintaining the application of heat to said area at least until the blank is deposited over a die;

then applying from the other side of the blank heat to the other bonding area;

and finally moving the blank into the die to effect setting up of the blank.

6. In the method of setting up a box from a foldable blank comprising two areas to be overlapped and bonded in set-up condition by a thermoplastic adhesive pre-applied to said areas, which two areas lie on opposite sides of the blank, the steps of:

transferring the blank from a magazine to a die and during transfer applying from one side of the blank heat to a first bonding area;

depositing the blank over a die and applying while the blank is at rest heat from the other side of the blank to a second bonding area to be adhered to the first area;

moving the blank through the die to effect setting up of the blank and immediately thereafter passing the blank, while still in motion, through a nip of rollers so disposed as to exert temporary compressive force to the bonded areas.

7. In the method of setting up flat box blanks comprising areas coated with preapplied adhesive of thermoplastic material, which areas lie on opposite surfaces of the blank and are to be overlapped and bonded in set up condition, the blanks being stored as a stack in a magazine from which they are transferred singly to a die by a blank feeder carrier, whereafter the blank is moved through the die by a plunger to effect setting up of the blank, the steps of:

applying heat to a first bonding area on one surface of the blank while the blank is in motion between said magazine and said die;

applying heat to a second bonding area on the opposite surface of the blank while the blank is at rest over said die, said second area to be overlapped in the setting up, and bonded to, said first area;

moving in a continuous motion the blank first into the die to effect setting up of the blank and then through a restricted passage so disposed as to exert momentarily a compressive force on the bonding areas during passage therethrough.

8. A device for folding a heat sealable blank into box form and adhering two areas of the blank at a box corner, the device comprising, in combination, a folding die; a plunger adapted to pass into the die; a prefolding element in advance of the die; a feeder for moving a blank from a source of supply into engagement with said prefolding element, said element being in the path of the feeder engaged blank so as to prefold a portion of the feeder engaged blank with respect to the remainder of the blank, said portion comprising one of said areas; means for heating at least that portion of the prefolding element which engages said one area; a heating means on, and movable with, said feeder and so located as to apply heat to the other of said two areas; drive means for periodically moving said plunger into and out of said die; and means timed with respect to said drive means for operating said feeder.

9. A device for folding a heat sealable blank into box form and adhering two areas of the blank at a box corner, the device comprising, in combination, a folding die; a plunger adapted to pass into the die; a prefolding element in advance of the die; a feeder for moving a blank from a source of supply into engagement with said prefolding element, said element being in the path of the feeder engaged blank so as to prefold a portion of the feeder engaged blank with respect to the remainder of the blank; said portion comprising one of said areas; means for heating at least that portion of the prefolding element which engages said one area; a heating means on, and movable with, said feeder and so located as to apply heat to the other of said two areas; drive means for periodically moving said plunger into and out of said die; means timed with respect to said drive means for operating said feeder; and a roller mounted below the entrance of said die and adjacent the path of said plunger for exerting compressive force on said areas as the plunger supported folded blank passes said roller.

10. A device for folding a heat sealable blank into box form and adhering two areas of the blank at a box corner, the device comprising, in combination, a folding die; a plunger adapted to pass into the die; a prefolding element in advance of the die; a feeder for moving a blank from a source of supply into engagement with said prefolding element, said element being in the path of the feeder engaged blank so as to prefold a portion of the feeder engaged blank with respect to the remainder of the blank, said portion comprising one of said areas; means for heating at least that portion of the prefolding element which engages said one area; a heating means on, and movable with, said feeder and so located as to apply heat to the other of said two areas; drive means for periodically moving said plunger into and out of said die; means timed with respect to said drive means for operating said feeder; and a pair of rollers mounted below the entrance of said die, said rollers forming a nip through which the plunger and the blank folded about the plunger pass, said rollers being so located as to exert compressive force on said areas folded face to face by said die.

11. A device for setting up into box form a blank comprising a main panel, side panels and end panels articulated to the main panel, and corner flaps articulated to said end panels and adapted to be folded into contact with said side panels and adhered thereto by preapplied thermoplastic adhesive, the device comprising, in combination, a magazine for stacking flat blanks; a die comprising side panel camming elements and end panel camming elements; a plunger for moving a blank through said die and folding the blank about the plunger, the said camming elements being so disposed with respect to the plunger as to fold the end panels and flaps into upright box forming position before contact of the flaps with the side panels; a feeder carrier for grasping individual blanks and transporting them from said magazine to said die; a first heater on, and movable with, said carrier for applying heat to an adhesive coated side wall area of the blank during transport from the magazine to the die; a second heater on said die in a position to underlie a blank deposited on the die by the feeder to heat an adhesive coated area of a flap after deposit of the blank on the die by the feeder carrier; and a pair of rollers underneath said camming elements and within the stroke of the plunger, said rollers forming a nip through which the folded and plunger supported blank passes, said rollers being so located as to exert compressive force on said flaps as the blank passes through the nip.

12. A device for setting up into box form a blank of paperboard and the like having areas of preapplied thermoplastic adhesive on opposite surfaces of the blank, the machine comprising, in combination, a magazine for stacking flat blanks; a die comprising end panel camming elements and side panel camming elements; a plunger for moving the blank through said die to effect folding of the blank about the plunger; a feeder carrier for grasping individual blanks and transporting them from said magazine to said die; a first heater on, and movable with, said carrier for applying heat to an adhesive coated area on one surface of the blank during transport from the magazine to the die; a second heater on said die in a position to underlie a blank deposited on the die by the feeder to heat an adhesive coated area on the other surface of the blank during the period after deposit of the blank on the die by the said carrier and the moment the plunger engages the blank to move it into, and through, the die; and a pair of rollers underneath the die and within the stroke of the plunger, said rollers being arranged to exert momentary compressive force on the previously heated areas of the blank folded into box form about the plunger as the plunger and box pass between the rollers.

References Cited by the Examiner
UNITED STATES PATENTS

| | | | |
|---|---|---|---|
| 2,321,562 | 6/43 | Coy et al. | 93—51 |
| 2,830,507 | 4/58 | Hickin et al. | 93—51 |
| 2,911,942 | 11/59 | Gross | 93—51 X |
| 2,984,598 | 5/61 | Gobalet | 93—36 X |
| 3,008,386 | 11/61 | Mosse | 93—51 |

FRANK E. BAILEY, *Primary Examiner.*

FRANK H. BRONAUGH, *Examiner.*